William T. Clark
INVENTOR.

INVENTOR.
William T. Clark

Dec. 26, 1967 W. T. CLARK 3,359,682
SHUTTER CONSTRUCTION FOR OBSERVATORY DOME
Filed April 6, 1966 4 Sheets-Sheet 3
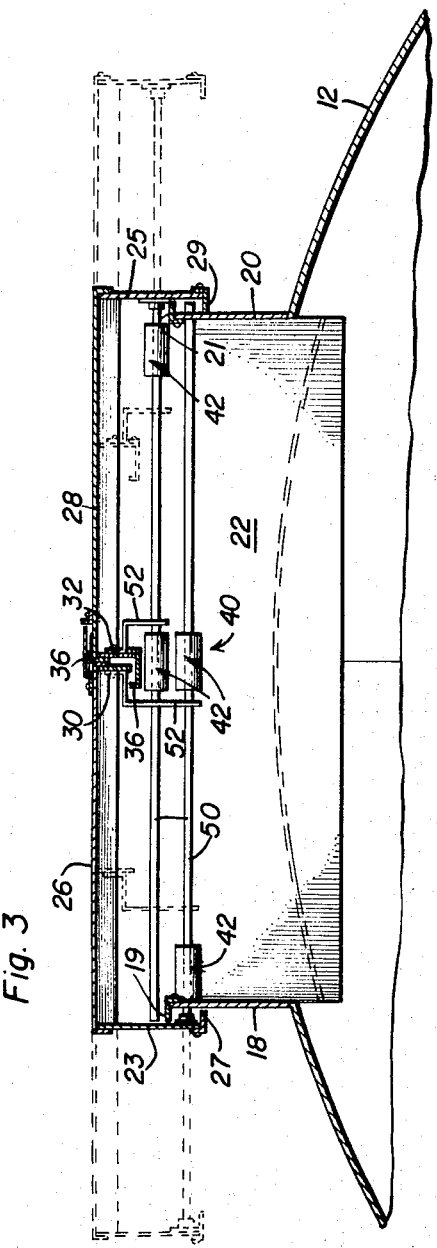
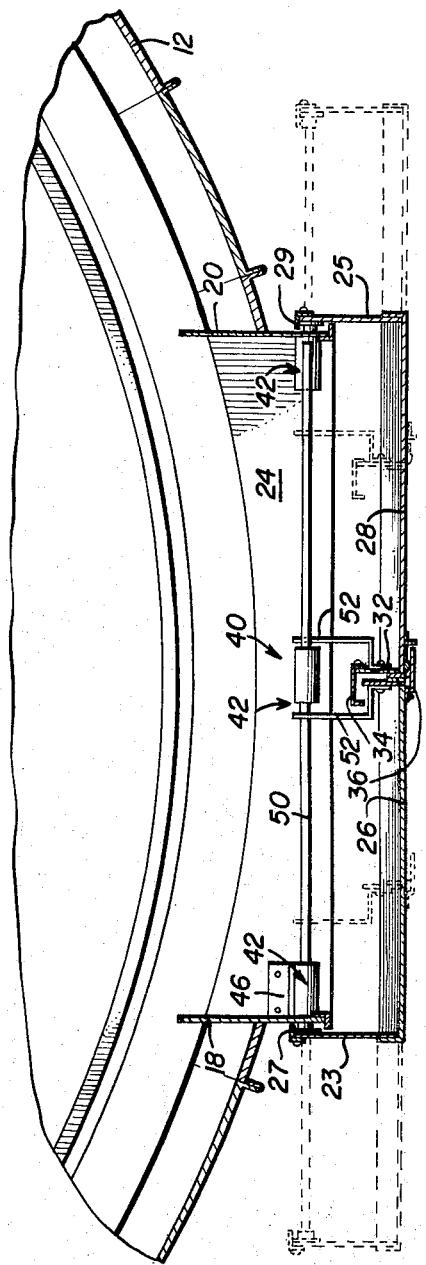
William T. Clark INVENTOR.
BY *Clarence A. O'Brien*
and *Harvey B. Jacobson*
Attorneys Dec. 26, 1967   W. T. CLARK   3,359,682
SHUTTER CONSTRUCTION FOR OBSERVATORY DOME
Filed April 6, 1966   4 Sheets-Sheet 4
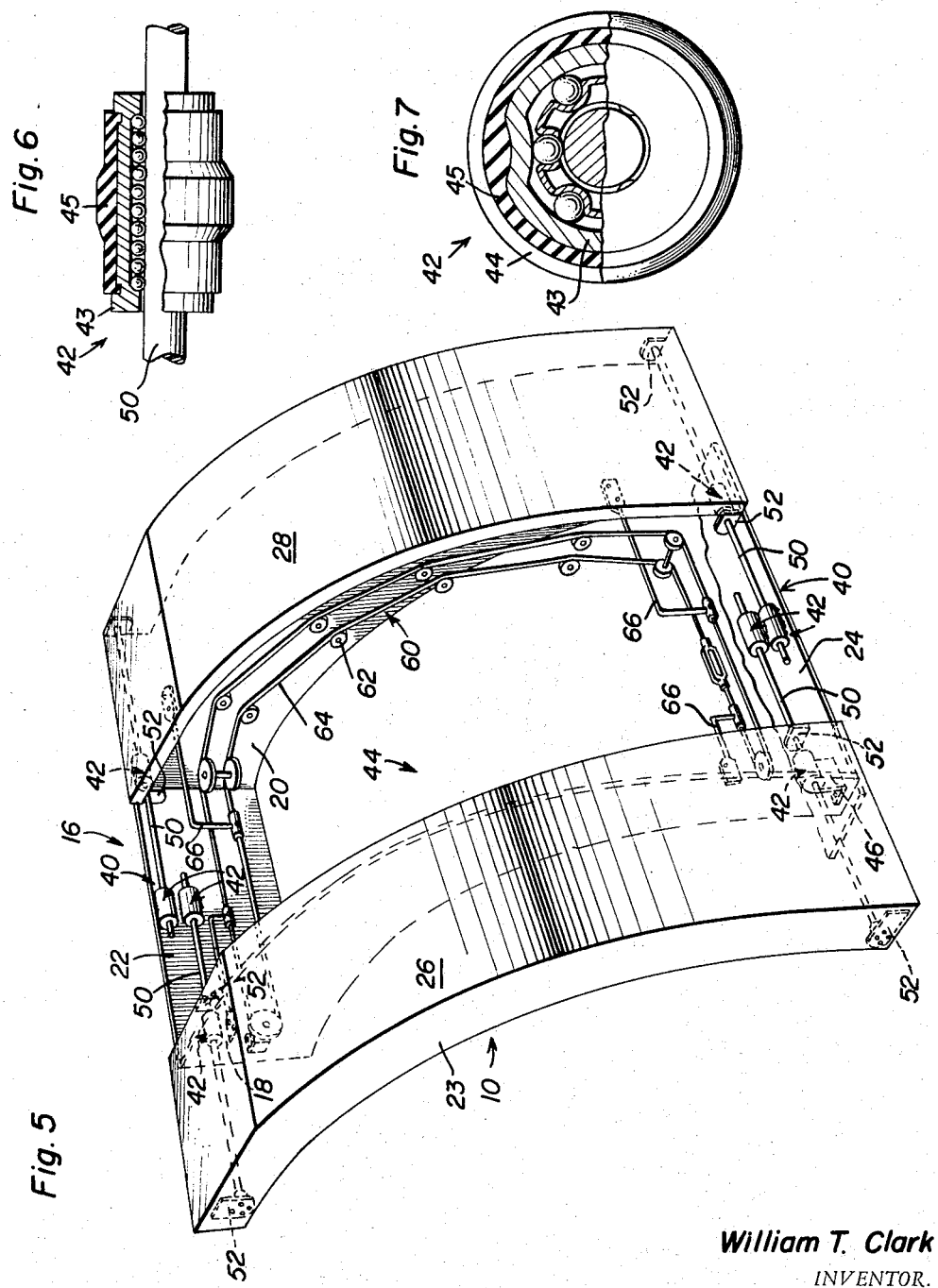
William T. Clark
INVENTOR.

United States Patent Office 3,359,682
Patented Dec. 26, 1967

3,359,682
SHUTTER CONSTRUCTION FOR OBSERVATORY
DOME
William T. Clark, P.O. Box 885, Jackson, Miss. 39205
Filed Apr. 6, 1966, Ser. No. 540,668
9 Claims. (Cl. 49—40)

This invention relates generally to shutters for observatory domes and more particularly to a novel means for movably supporting observatory dome shutters.

Observatory domes which are adapted to be utilized for astronomical purposes are generally of a hemispherical configuration provided with an aperture of generally rectangular configuration running longitudinally from the area of the apex of the dome downwardly to the vicinity of the equatorial region of the dome so as to facilitate the sighting of a telescope or the like therethrough.

A dome of the nature described is generally provided with a weather tight shutter assembly adapted to permit selective opening or closing of the sighting aperture. The shutters utilized are normally fabricated from sheet metal and are characterized by a generally elongated rectangular lognitudinally curved, or convex, configuration and are mounted exteriorly of the dome so as to be adapted to uncover the sighting aperture by outward movement of the shutters on a plane tangentially disposed with respect to the curvature of the dome.

Shutter structures proposed heretofore generally require the utilization of shutter support means disposed exteriorly of the dome in order to provide support for the shutters as they are moved outwardly to uncover the sighting aperture. Such a construction has been found to give rise to a number of problems, one of which is that the exteriorly disposed shutter support means, which is generally in the nature of a channel or beam trackway, is subjected to the elements and therefore tends to be adversely effected thereby, particularly by virtue of the accumulation of foreign material on the trackways which interferes with the efficient operation of the shutter supporting and operating mechanism.

It is, therefore, an object of the present invention to provide a novel shutter construction wherein the mechanism necessary for movably supporting the shutters is substantially contained within the interior of the observatory dome so as to substantially avoid the problems attendant observatory dome shutter constructions proposed heretofore.

It is another object of the present invention to provide a novel shutter mounting means for observatory domes and the like whereby the shutters are provided with support assemblies generally comprising linear bearing means rigidly secured substantially within the interior of the dome, or a sighting aperture frame secured thereto, which bearing means is adapted to slidably receive shutter traversing rods which are rigidly secured to the inner, or underside, of the shutters so as to permit linear movement of the shutters to uncover and cover the sighting aperture without the necessity of utilizing exteriorly mounted trackways and the like.

It is a further object of the present invention to provide an observatory dome shutter mounting construction of the general nature described wherein the bearing means supporting the shutter traversing rods is of such a configuration so as to completely encircle the rods in a precision manner thereby assuring alignment of the shutters with the aperture when the shutters are in closed position thus assuring a substantially weather tight sealing of the sighting aperture.

Still another object of the present invention is to provide a novel observatory dome shutter mounting construction wherein there is provided an anti-friction rolling bearing means carried by the dome and adapted to linearly and slidably receive precision machined, and preferably case hardened, shutter supporting and traversing rods secured to the inwardly disposed end portions of the shutters.

A further object of the present invention is to provide a novel construction for observatory dome shutters wherein the means for movably supporting and traversing the shutters is substantially contained within an upwardly and outwardly extending shutter aperture frame surrounding the sighting aperture in the dome.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary top elevational view of a generally hemispherical observatory dome or the like provided with a shutter assembly constructed in accordance with the present invention with the shutters shown in closed, overlying relationship with respect to a sighting aperture and further showing in phantom lines the position of the shutters when they are traversed outwardly to uncover the sighting aperture;

FIGURE 3 is an enlarged fragmentary transverse vertical sectional view of the shutter assembly taken substantially along the plane of the line 3—3 of FIGURE 1;

FIGURE 4 is an enlarged fragmentary horizontal sectional view taken substantially along the plane of the line 4—4 of FIGURE 2;

FIGURE 5 is a perspective view of the shutter assembly showing the shutters in open position and further showing the general organization of the shutter mounting and traversing means;

FIGURE 6 is an enlarged detailed fragmentary illustration of a preferred resiliently mounted linear bearing means with portions shown in section to illustrate certain details thereof; and FIGURE 7 is an enlarged transverse fragmentary sectional view of the linear bearing means of FIGURE 6 shown mounted within a bearing housing means.

Figure 1:
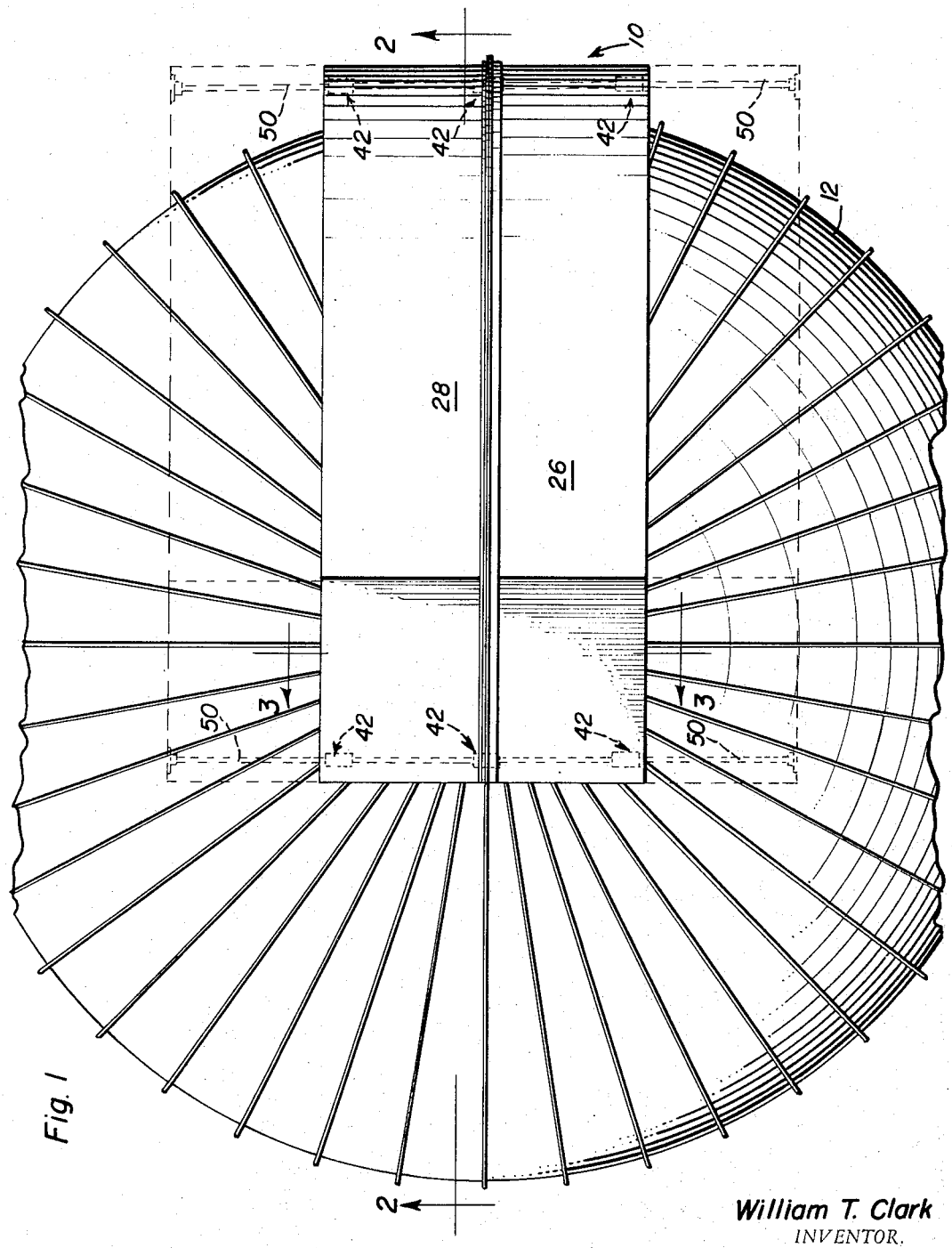
Figure 2:
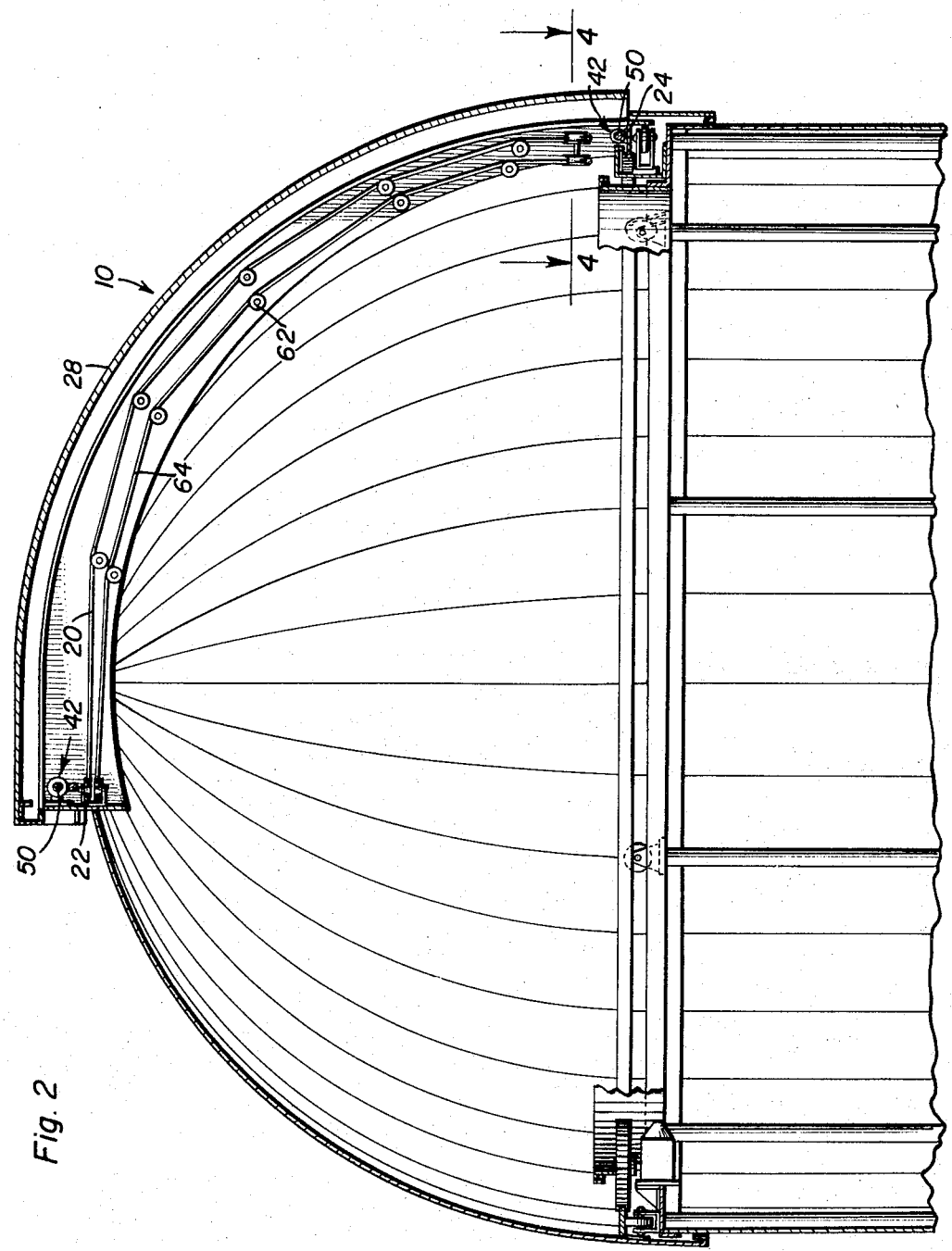
FIGURE 2 is a vertical sectional view of the dome of FIGURE 1 taken substantially along the plane of the line 2—2 of FIGURE 1 showing the shutter assembly of the present invention mounted upon a generally hemispherical rotatable observatory dome.

Referring now more particularly to the embodiment of the invention illustrated in the drawings it will be noted that the shutter assembly indicated generally by the numeral 10 is illustrated in conjunction with a generally hemispherical, rotatably mounted observatory dome 12 provided with a sighting aperture, or opening, indicated generally at 14 characterized as a generally elongated rectangular aperture in the compound curvilinear dome 12.

While the shutter assembly 10 is illustrated in conjunction with an observatory dome devoid of any significant internal bracing it will be nevertheless understood that a shutter assembly constructed in accordance with the present invention may be utilized in conjunction with observatory domes and the like characterized by other modes of construction as well as structures of other than generally hemispherical configuration.

As seen best in FIGURES 3, 4 and 5 the exemplary embodiment of the shutter assembly 10 illustrated therein is provided with a shutter aperture frame assembly 16 integrally secured to the exterior of the dome 12 adjacent to the periphery of the sighting aperture or opening 14 and comprises vertically disposed side and rear wall members 18, 20 and 22 respectively and a horizontally disposed integral front wall member 24. Accordingly, it may be seen that the shutter aperture frame assembly 16 is a generally rectangular, longitudinally curved frame which is open at the top and bottom. As illustrated, the sight opening 14, and consequently the shutter aperture frame assembly 16, extend from a point adjacent the apex of the dome 12 downwardly substantially to the equatorial region thereof. It will be understood however, that a shutter assembly such as that contemplated by the present invention may be utilized in conjunction with sighting apertures other than that illustrated herein.

The shutter assembly 10 further includes a pair of generally rectangular longitudinally curved shutters 26 and 28 formed of sheet metal for example. The curvature of the shutters conforms generally to the curvature of the dome 12 and more specifically to the curvature of the outwardly disposed edges of the shutter frame assembly side walls 18 and 20.

Although not critical to the practice of the present invention the shutter assembly 10 has been shown as provided with a weather sealing means for the shutter panels 26, 28 and the shutter aperture frame assembly 16. Thus, referring particularly to FIGURES 3, 4 and 5 it will be observed that the vertically disposed side walls 18 and 20 of the shutter aperture frame assembly 16 are provided at their upper ends with outwardly turned flanges 19 and 21. The side edges of the shutters 26 and 28 at their outer ends are provided with outwardly depending sealing strips 23 and 25 which at the lower ends are provided with inturned flanges 27 and 29 as seen best in FIGURES 3 and 4. The abutting surfaces of the depending edges 30 and 32 of the shutter panels 26 and 28 are effectively sealed, in closed position, by a trough member 34 secured to the flange 32 in an exteriorly disposed flange 36 secured to the shutter panel 26.

The shutter panels 26 and 28 are mounted to the dome 12, and preferably the shutter aperture frame assembly 16, for lateral movement toward and away from each other, as illustrated by the phantom lines in FIGURES 1, 3 and 4, in order to facilitate selectively covering and uncovering the shutter aperture, or sight opening 14 in the dome 12.

Toward this end, a shutter mounting means indicated generally at 40 is provided to facilitate movably mounting the shutter panels 26 and 28. The shutter mounting means 40 includes a plurality of generally identical linear bearing or bushing means 42. The linear bearing means 42 are rigidly secured to the dome 12, or as illustrated herein within the shutter aperture frame assembly 16, in a manner to be described in detail.

As seen best in FIGURE 5 each of the respective shutter panels 26 and 28 is provided with a linear bearing means adjacent the upper and lower inwardly disposed ends thereof.

In the embodiment illustrated the centrally disposed linear bearing means 42 are preferably although not necessarily rolling contact anti-friction linear bearings 43 utilizing recirculating balls, as seen best in FIGURES 6 and 7. The linear bearing means 42 include a bearing housing 44 welded or otherwise permanently rigidly secured to the respective shutter aperture frame assembly walls 22 and 24 either directly or by means of a bracket such as indicated at 46, and are preferably positioned as seen best in FIGURES 3, 4 and 5 so as to slidably, and preferably non-rotatably receive within the linear bearing 43 mounted therein laterally disposed shutter supporting and traversing rods 50. The rods 50 are rigidly secured to the inwardly disposed portions of the shutter panels 26 and 28 adjacent the ends thereof either directly or by means of suitable brackets such as indicated at 52 so as to properly align the rods 50 with the bearings 43 within the bearing means 42 to insure proper alignment of the shutters in the closed position as illustrated in FIGURES 3 and 4. The shafts 50, of which there are preferably two or more for each shutter panel are substantially longer than the width of the associated shutter and preferably extend to the opposite side of the sighting aperture, for example, so as to permit lateral movement of the shutters 26 and 28 outwardly from the full line closed position shown in FIGURES 3 and 4 to the open position shown in full lines in FIGURE 5 and in phantom lines in FIGURES 1, 3 and 4.

The shutter support rods 50 are preferably sized by machining so as to coact with the linear bearings 43 in a precision manner whereby undue radial deflection of the shaft 50 is avoided as the shaft 50 moves linearly through the bearings 43.

As seen in FIGURES 6 and 7 and as indicated heretofore, the linear bearings 43 are of the recirculating ball bearing type and are of conventional construction. The bearings 43 are preferably, although not necessarily, resiliently mounted in the bearing housings 44 by resilient bushings 45 such as of neoprene so as to compensate for any slight misalignment of the bearing housing 44 during mounting thereof. Furthermore, it will be understood that the linear bearings 43 may be of other than a recirculating ball type without departing from the spirit of the invention wherein linear travel bearings rigidly secured to the dome coact with linearly and slidably received and completely encircled complementary shafts of various cross-sectional configurations secured to the interior of the shutter panels which are utilized to cover the sight opening.

The shutter assembly 10 is also preferably provided with a shutter traversing and operating means indicated generally at 60 which includes a plurality of rotatable idler sprocket chain or cable pulleys such as indicated at 62 secured to the walls of the shutter aperture frame assembly 16. An endless flexible member 64 such as a cable or sprocket chain for example is entrained over the pulleys 62. Movement of the endless member 64 by a power or manual means not shown effects opening and closing of the shutter panels 26, 28 by virtue of the fact that the endless member 64 is connected to the respective panels 26 and 28 by suitably placed connecting linkages indicated at 66.

Although the operation of the shutter assembly 10 to effect opening and closing of the sight aperture or opening 14 is considered to be relatively obvious from the foregoing it will nevertheless be discussed in more detail. Accordingly, it will be understood that the shutter panels 26 and 28 and their associated rigidly secured shafts 50 may be traversed laterally from the closed position illustrated in full lines in FIGURES 1, 3 and 4 to the full line open position shown in FIGURE 5 by virtue of the fact that the bearings 43 permit linear movement of the shaft 50 therethrough so as to move the shutter panels 26 and 28 into an open, cantilevered position, outwardly of the sight opening 14 so as to facilitate sighting of a telescope or other astronomical instrument therethrough.

Moreover, the traversing of the shafts 50 through their associated bearings 42 may be effected by manual or power operated means and conceivably in the case of a relatively small dome the shutter panels 26 and 28 could be opened and closed manually without the assistance of a traversing and operating means such as that illustrated at 60.

Furthermore, from the foregoing it will be readily apparent that in the closed position the shutter panels 26 and 28 protect all portions of the shutter mounting means or assembly 40 from the elements thus substantially precluding the likelihood of the mounting mechanism being damaged or otherwise adversely affected by inclement weather conditions.

While the shutter mounting means 40 as illustrated herein is rigidly secured to the shutter aperture frame assembly means 16 it will be appreciated that the principles of the present invention could be carried forth by rigidly securing the bearing means 40 directly to the dome 12 adjacent the periphery of a sight opening such as that indicated at 14 without departing from the spirit of the invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A shutter construction for a generally hemispherical observatory dome and the like having a shutter aperture therein, said shutter construction comprising first and second shutter members, means mounting said shutter members to said dome for lateral movement toward and away from each other for covering and uncovering the shutter aperture in the dome, said shutter mounting means comprising first and second shutter support assemblies including bearing means secured to the dome adjacent the shutter aperture and shaft means secured to said shutters and slidably carried by said bearing means whereby said shutters are supported for relatively friction free linear travel by said shutter mounting means.

2. The combination of claim 1 including shutter operating means, said operating means comprising rotatable pulleys mounted upon said dome, an endless flexible member entrained over said pulleys, connections attaching the upper and lower ends of each shutter to said endless member for simultaneous movement of said shutters and away from each other upon movement of said endless member.

3. A shutter construction for a generally hemispherical observatory dome and the like having a shutter aperture therein, said shutter construction comprising first and second shutter members generally conforming to the contour of the dome, means mounting said shutter members to said dome for lateral movement toward and away from each other in a common plane for covering and uncovering the shutter aperture, shutter aperture frame means secured to the dome adjacent the periphery of the aperture opening, said shutter mounting means comprising first and second shutter support assemblies, said assemblies including bearing means secured to the shutter aperture frame means and adapted to encircle and support shaft means for sliding linear motion, and shaft means secured to said shutters and slidably journaled in said bearing means whereby said shutters are supported for relatively friction free linear travel by said shutter mounting means.

4. The combination of claim 3 including shutter operating means, said operating means comprising rotatable pulleys mounted upon the interior of said shutter aperture frame means, an endless flexible member entrained over said pulleys, connections attaching the upper and lower ends of each shutter to said endless member for simultaneous movement of said shutters and away from each other upon movement of said endless member.

5. The combination of claim 3 wherein said shutter aperture frame means comprises vertically disposed upwardly extending integral side and rear wall members secured to the dome adjacent the periphery of the shutter aperture and a horizontally disposed outwardly extending front wall member secured to said dome and integral with said side wall members.

6. The combination of claim 3 wherein said bearing means comprises rolling contact anti-friction linear bearing means.

7. The combination of claim 6 wherein said rolling contact anti-friction linear bearing means comprises ball bearings.

8. The combination of claim 3 wherein said shaft means comprises a precision diameter shaft having a hardened surface.

9. The combination of claim 3 wherein said bearing means are provided with means rigidly yet resiliently securing the bearing means to the shutter aperture frame.

References Cited
UNITED STATES PATENTS

| | | | |
|---|---|---|---|
| 2,457,625 | 12/1948 | Amiot | 49—40 |
| 2,996,844 | 8/1961 | Paulson | 52—65 |
| 3,245,178 | 4/1966 | Clark | 49—123 X |
| 3,321,017 | 4/1967 | Witherspoon et al. | 49—41 X |

DAVID J. WILLIAMOWSKY, *Primary Examiner.*

J. KARL BELL, *Assistant Examiner.*